(12) United States Patent
Fripp et al.

(10) Patent No.: US 11,286,741 B2
(45) Date of Patent: Mar. 29, 2022

(54) DOWNHOLE TOOLS COMPRISING OIL-DEGRADABLE SEALING ELEMENTS

(71) Applicant: Halliburton Energy Services, Inc., Houston, TX (US)

(72) Inventors: Michael Linley Fripp, Carrollton, TX (US); Zachary Murphree, Dallas, TX (US); Zach Walton, Carrollton, TX (US); Charles Timothy Smith, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 707 days.

(21) Appl. No.: 14/433,304

(22) PCT Filed: May 7, 2014

(86) PCT No.: PCT/US2014/037083
§ 371 (c)(1),
(2) Date: Apr. 2, 2015

(87) PCT Pub. No.: WO2015/171126
PCT Pub. Date: Nov. 12, 2015

(65) Prior Publication Data
US 2016/0258240 A1    Sep. 8, 2016

(51) Int. Cl.
*E21B 33/12*    (2006.01)
*E21B 43/26*    (2006.01)
*E21B 33/128*   (2006.01)
*E21B 33/134*   (2006.01)
*C09K 8/508*    (2006.01)

(52) U.S. Cl.
CPC ............ *E21B 33/12* (2013.01); *C09K 8/5083* (2013.01); *C09K 8/5086* (2013.01); *E21B 33/128* (2013.01); *E21B 33/134* (2013.01); *E21B 43/26* (2013.01); *E21B 2200/04* (2020.05)

(58) Field of Classification Search
CPC ...... E21B 33/12; E21B 33/128; E21B 33/134; E21B 43/26; E21B 2034/002; C09K 8/5083; C09K 8/5086
USPC ........................................................ 166/376
See application file for complete search history.

(56) References Cited

U.S. PATENT DOCUMENTS 5,629,270 A   5/1997   Van Slyke
5,649,596 A   7/1997   Jones et al.
(Continued)

FOREIGN PATENT DOCUMENTS

WO    2015171126 A1    11/2015

OTHER PUBLICATIONS

International Search Report and Written Opinion for PCT/US2014/037083 dated Feb. 6, 2015.

*Primary Examiner* — Matthew Troutman
*Assistant Examiner* — Patrick F Lambe
(74) *Attorney, Agent, or Firm* — McGuireWoods LLP

(57) ABSTRACT

Downhole tools comprising a body, wherein at least a portion of the body is degradable when exposed to a wellbore environment; and at least one oil-degradable sealing element composed of an oil-degradable elastomer, wherein the oil-degradable sealing element degrades in the wellbore environment. The oil-degradable elastomer is selected from the group consisting of an oil-degradable natural rubber, an oil-degradable synthetic rubber, and any combination thereof.

31 Claims, 3 Drawing Sheets

(56) References Cited

U.S. PATENT DOCUMENTS

| | | | |
|---|---|---|---|
| 6,076,600 A * | 6/2000 | Vick, Jr | E21B 33/1208 |
| | | | 166/192 |
| 7,168,494 B2 | 1/2007 | Starr et al. | |
| 7,353,879 B2 | 4/2008 | Todd et al. | |
| 7,699,101 B2 | 4/2010 | Fripp et al. | |
| 7,886,822 B2 | 2/2011 | Garcia-Lopez De Victoria et al. | |
| 8,127,856 B1 | 3/2012 | Nish et al. | |
| 8,272,446 B2 | 9/2012 | Swor et al. | |
| 8,291,970 B2 | 10/2012 | Swor et al. | |
| 8,464,800 B2 | 6/2013 | Nutley et al. | |
| 2006/0186601 A1 * | 8/2006 | Lopez | E21B 33/12 |
| | | | 277/327 |
| 2008/0149345 A1 * | 6/2008 | Marya | E21B 23/00 |
| | | | 166/376 |
| 2010/0101803 A1 | 4/2010 | Clayton et al. | |
| 2011/0067889 A1 * | 3/2011 | Marya | E21B 33/134 |
| | | | 166/386 |
| 2011/0186307 A1 * | 8/2011 | Derby | E21B 33/1208 |
| | | | 166/386 |
| 2012/0181032 A1 | 7/2012 | Naedler et al. | |
| 2013/0217604 A1 | 8/2013 | Fisk, Jr. | |
| 2013/0240203 A1 * | 9/2013 | Frazier | E21B 33/129 |
| | | | 166/193 |
| 2014/0076571 A1 | 3/2014 | Frazier et al. | |
| 2017/0016298 A1 * | 1/2017 | Takahashi | C08K 5/0016 |

* cited by examiner

DOWNHOLE TOOLS COMPRISING OIL-DEGRADABLE SEALING ELEMENTS

BACKGROUND

The present disclosure generally relates to downhole tools comprising oil-degradable sealing elements and, more specifically, to downhole tools comprising a body and an oil-degradable sealing element, wherein at least a portion of the body is also degradable upon exposure to a wellbore environment.

A variety of downhole tools are within a wellbore in connection with producing or reworking a hydrocarbon bearing subterranean formation. The downhole tool may comprise a wellbore zonal isolation device capable of fluidly sealing two sections of the wellbore from one another and maintaining differential pressure (i.e., to isolate one pressure zone from another). The wellbore zonal isolation device may be used in direct contact with the formation face of the wellbore, with casing string, with a screen or wire mesh, and the like.

After the production or reworking operation is complete, the seal formed by the downhole tool must be broken and the tool itself removed from the wellbore. The downhole tool must be removed to allow for production or further operations to proceed without being hindered by the presence of the downhole tool. Removal of the downhole tool(s) is traditionally accomplished by complex retrieval operations involving milling or drilling the downhole tool for mechanical retrieval. In order to facilitate such operations, downhole tools have traditionally been composed of drillable metal materials, such as cast iron, brass, or aluminum. These operations can be costly and time consuming, as they involve introducing a tool string (e.g., a mechanical connection to the surface) into the wellbore, milling or drilling out the downhole tool (e.g., at least breaking the seal), and mechanically retrieving the downhole tool or pieces thereof from the wellbore to bring to the surface.

To reduce the cost and time required to mill or drill a downhole tool from a wellbore for its removal, dissolvable or degradable downhole tools have been developed. Traditionally, however, such dissolvable downhole tools have been designed only such that the dissolvable portion includes the tool body itself and not any sealing element of the downhole tool. This is particularly evident because the dissolvable materials that have been proposed for use in forming a downhole tool body are often highly brittle and are physically or chemically incapable of exhibiting expansive or elastic properties necessary for a sealing element. Instead, the known dissolvable downhole tools may dissolve such that it no longer provides the structural integrity necessary for achieving an effective seal with the non-dissolvable sealing element.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
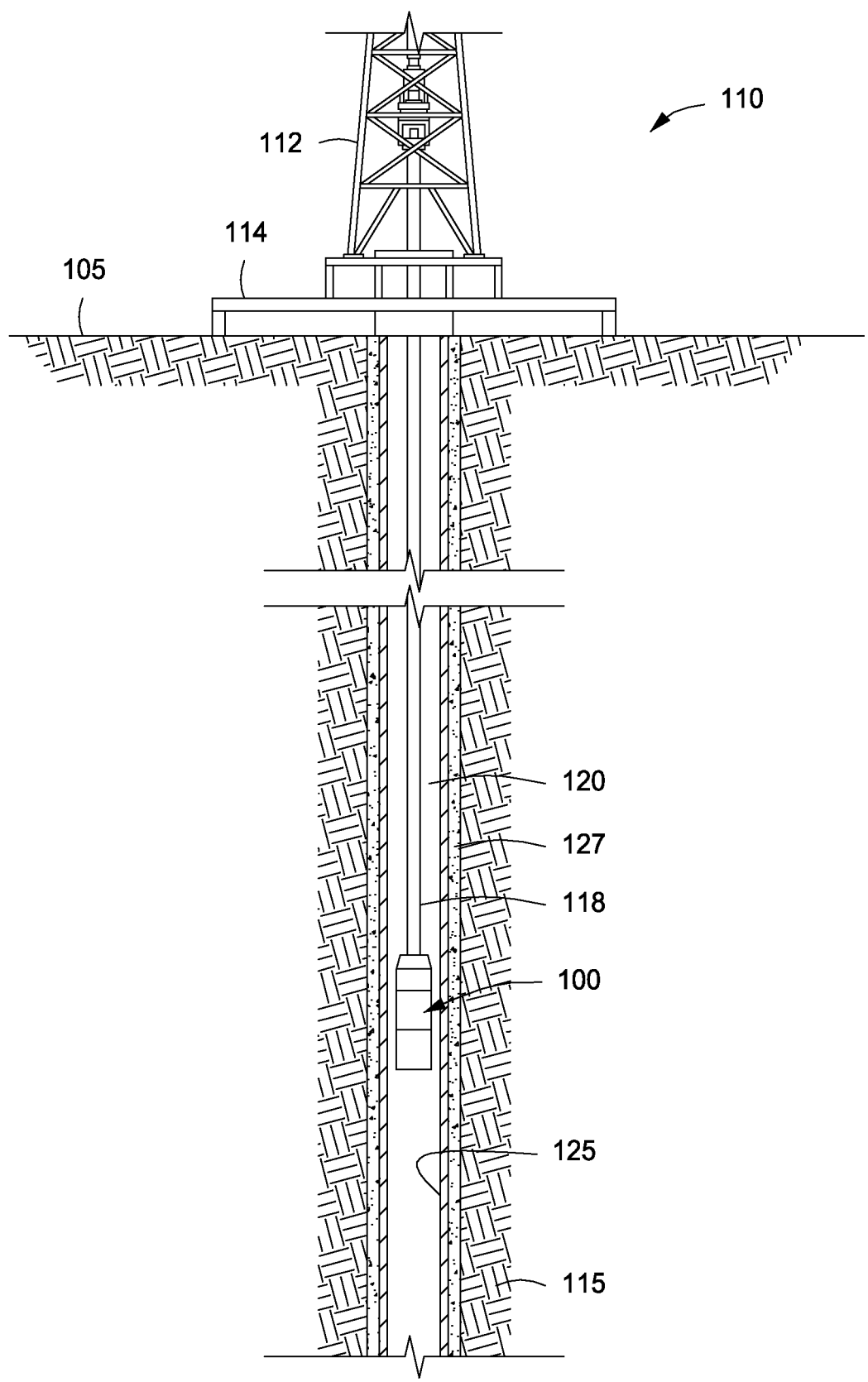
FIG. 1 illustrates a cross-sectional view of a well system comprising a downhole tool, according to one or more embodiments described herein.

The present disclosure generally relates to downhole tools comprising oil-degradable sealing elements and, more specifically, to downhole tools comprising a body and an oil-degradable sealing element, wherein at least a portion of the body is also degradable upon exposure to a wellbore environment. As used herein, the term "degradable" and all of its grammatical variants (e.g., "degrade," "degradation," "degrading," and the like) refers to the process of or the ability to break down wholly or partially by any mechanism.

Disclosed are various embodiments of a downhole tool including an oil-degradable sealing element capable of fluidly sealing two sections of a wellbore (which may be also referred to as "setting" the downhole tool). The downhole tool may have various setting mechanisms for fluidly sealing the sections of the wellbore with the sealing element including, but not limited to, hydraulic setting, mechanical setting, setting by swelling, setting by inflation, and the like. The downhole tool may be a well isolation device, such as a frac plug, a bridge plug, or a packer, a wiper plug, a cement plug, or any other tool requiring a sealing element for use in a downhole operation. Such downhole operations may include, but are not limited to, any type of fluid injection operation (e.g. a stimulation/fracturing operation, a pinpoint acid stimulation, casing repair, and the like), and the like. In some embodiments, the downhole tool may comprise a body and at least one oil-degradable sealing element composed of an oil-degradable elastomer. The oil-degradable sealing element may degrade in a wellbore environment, such as upon contact with a hydrocarbon fluid therein. As discussed in detail below, degradation of the oil-degradable sealing element may be accelerated, rapid, or normal, degrading anywhere from about 30 minutes to about 40 days from first contact with a hydrocarbon.

In some embodiments, at least a portion of the body itself may also be degradable upon exposure to the wellbore environment. The embodiments herein permit fluid sealing of two wellbore sections with a downhole tool having an oil-degradable sealing element that later degrades in situ, preferably without the need to mill or drill, and retrieve the downhole tool from the wellbore. In particular, the degradation of the oil-degradable sealing element results in failure of the sealing element to maintain differential pressure and form an effective seal. In such cases, the downhole tool may drop into a rathole in the wellbore without the need for retrieval or may be sufficiently degraded in the wellbore so as to be generally indiscernible. It will be appreciated by one of skill in the art that while the embodiments herein are described with reference to a downhole tool, the oil-degradable sealing elements disclosed herein may be used with any wellbore operation equipment that may preferentially degrade upon exposure to hydrocarbon fluids.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressed in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Referring now to FIG. 1, illustrated is an exemplary well system 110 for a downhole tool 100. As depicted, a derrick 112 with a rig floor 114 is positioned on the earth's surface 105. A wellbore 120 is positioned below the derrick 112 and the rig floor 114 and extends into subterranean formation 115. As shown, the wellbore may be lined with casing 125 that is cemented into place with cement 127. It will be appreciated that although FIG. 1 depicts the wellbore 120 having a casing 125 being cemented into place with cement 127, the wellbore 120 may be wholly or partially cased and wholly or partially cemented (i.e., the casing wholly or partially spans the wellbore and may or may not be wholly or partially cemented in place), without departing from the scope of the present disclosure. Moreover, the wellbore 120 may be an open-hole wellbore. A tool string 118 extends from the derrick 112 and the rig floor 114 downwardly into the wellbore 120. The tool string 118 may be any mechanical connection to the surface, such as, for example, wireline, slickline, jointed pipe, or coiled tubing. As depicted, the tool string 118 suspends the downhole tool 100 for placement into the wellbore 120 at a desired location to perform a specific downhole operation. As previously mentioned, the downhole tool 100 may be any type of wellbore zonal isolation device including, but not limited to, a frac plug, a bridge plug, a packer, a wiper plug, or a cement plug.

It will be appreciated by one of skill in the art that the well system 110 of FIG. 1 is merely one example of a wide variety of well systems in which the principles of the present disclosure may be utilized. Accordingly, it will be appreciated that the principles of this disclosure are not necessarily limited to any of the details of the depicted well system 110, or the various components thereof, depicted in the drawings or otherwise described herein. For example, it is not necessary in keeping with the principles of this disclosure for the wellbore 120 to include a generally vertical cased section. The well system 110 may equally be employed in vertical and/or deviated wellbores, without departing from the scope of the present disclosure. Furthermore, it is not necessary for a single downhole tool 100 to be suspended from the tool string 118.

In addition, it is not necessary for the downhole tool 100 to be lowered into the wellbore 120 using the derrick 112. Rather, any other type of device suitable for lowering the downhole tool 100 into the wellbore 120 for placement at a desired location may be utilized without departing from the scope of the present disclosure such as, for example, mobile workover rigs, well servicing units, and the like. Although not depicted, the downhole tool 100 may alternatively be hydraulically pumped into the wellbore and, thus, not need the tool string 118 for delivery into the wellbore 120.

Although not depicted, the structure of the downhole tool 100 may take on a variety of forms to provide fluid sealing between two wellbore sections. The downhole tool 100, regardless of its specific structure as a specific type of wellbore zonal isolation device, comprises a body and a sealing element. Both the body and the sealing element may each be composed of the same material. Generally, however, the body provides structural rigidity and other mechanical features to the downhole tool 100 and the sealing element is a resilient or elastic material capable of providing a fluid seal between two sections of the wellbore 120.

Figure 2:
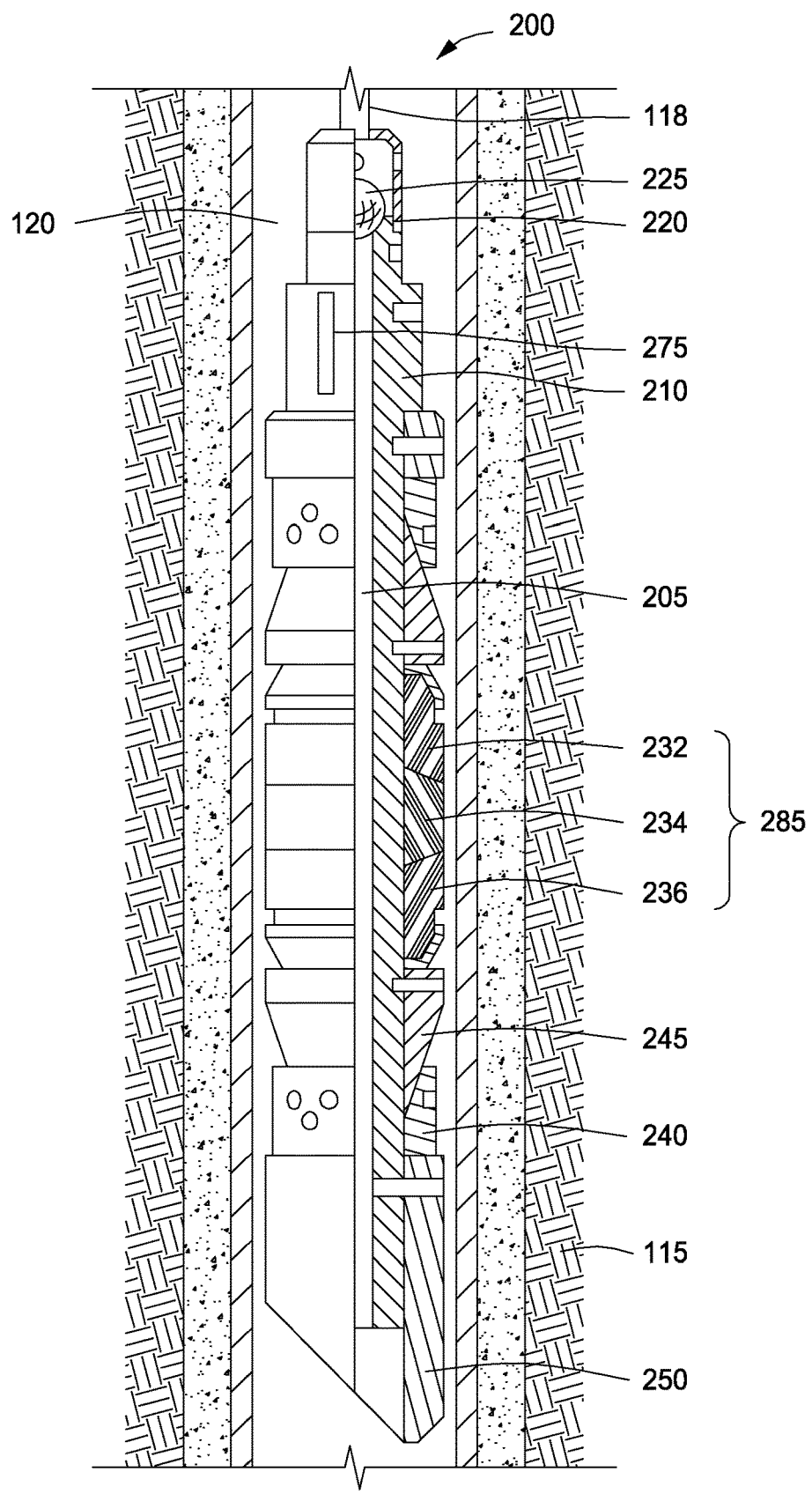
FIG. 2 depicts an enlarged cross-sectional view of a downhole tool, according to one or more embodiments described herein.

Referring now to FIG. 2, with continued reference to FIG. 1, one specific type of downhole tool described herein is a frac plug wellbore zonal isolation device for use during a well stimulation/fracturing operation. FIG. 2 illustrates a cross-sectional view of an exemplary frac plug 200 being lowered into a wellbore 120 on a tool string 118. As previously mentioned, the frac plug 200 generally comprises a body 210 and a sealing element 285. The sealing element 285, as depicted, comprises an upper sealing element 232, a center sealing element 234, and a lower sealing element 236. It will be appreciated that although the sealing element 285 is shown as having three portions (i.e., the upper sealing element 232, the center sealing element 234, and the lower sealing element 236), any other number of portions, or a single portion, may also be employed without departing from the scope of the present disclosure.

As depicted, the sealing element 285 is extending around the body 210; however, it may be of any other configuration suitable for allowing the sealing element 285 to form a fluid seal in the wellbore 120, without departing from the scope of the present disclosure. For example, in some embodiments, the body may comprise two sections joined together by the sealing element, such that the two sections of the body compress to permit the sealing element to make a fluid seal in the wellbore 120. Other such configurations are also suitable for use in the embodiments described herein. Moreover, although the sealing element 285 is depicted as located in a center section of the body 210, it will be appreciated that it may be located at any location along the length of the body 210, without departing from the scope of the present disclosure.

The body 210 of the frac plug 200 comprises an axial flowbore 205 extending therethrough. A cage 220 is formed at the upper end of the body 210 for retaining a ball 225 that acts as a one-way check valve. In particular, the ball 225 seals off the flowbore 205 to prevent flow downwardly therethrough, but permits flow upwardly through the flowbore 205. One or more slips 240 are mounted around the body 210 below the sealing element 285. The slips 240 are guided by a mechanical slip body 245. A tapered shoe 250 is provided at the lower end of the body 210 for guiding and protecting the frac plug 200 as it is lowered into the wellbore 120. An optional enclosure 275 for storing a chemical solution may also be mounted on the body 210 or may be formed integrally therein. In one embodiment, the enclosure 275 is formed of a frangible material.

One or both of the body 210 and the sealing element 285 may be composed of a degradable material. Specifically, the sealing element 285 may be at least partially composed of an oil-degradable elastomer that degrades, at least in part, in the presence of a hydrocarbon fluid, such as a hydrocarbon fluid in a wellbore environment. That is, the oil-degradable elastomer forming at least a portion of the sealing element 285 may wholly degrade or partially degrade; however, the amount of degradation is capable of causing the sealing element 285 to no longer maintain a fluid seal in the wellbore capable of maintaining differential pressure. Moreover, because the sealing element 285 degrades in the presence of a hydrocarbon fluid, the sealing element 285 may degrade during hydrocarbon production into the wellbore 120. The hydrocarbon fluid that may degrade the oil-degradable elastomer may include, but is not limited to, crude oil, a fractional distillate of crude oil a saturated hydrocarbon, an unsaturated hydrocarbon, a branched hydrocarbon, a cyclic hydrocarbon, and any combination thereof.

The oil-degradable elastomer forming at least a portion of the oil-degradable sealing element 285 may degrade by a number of mechanisms. For example, the oil-degradable sealing element 285 may degrade by swelling, dissolving, undergoing a chemical change, undergoing thermal degradation in combination with any of the foregoing, and any combination thereof. Degradation by swell involves the absorption by the oil-degradable elastomer of the hydrocarbon fluid in the wellbore environment such that the mechanical properties of the elastomer degrade. That is, the oil-degradable elastomer continues to absorb the hydrocarbon fluid until its mechanical properties are no longer capable of maintaining the integrity of the oil-degradable elastomer and it at least partially falls apart. In some embodiments, an oil-degradable elastomer may be designed to only partially degrade by swelling in order to ensure that the mechanical properties of the sealing element 285 formed from the oil-degradable elastomer is sufficiently capable of lasting for the duration of the specific operation in which it is utilized. Degradation by dissolving involves use of an oil-degradable elastomer that is soluble or otherwise susceptible to hydrocarbon fluid, such that the hydrocarbon fluid is not necessarily incorporated into the elastomer (as is the case with degradation by swelling), but becomes soluble upon contact with the hydrocarbon fluid. Degradation by undergoing a chemical change may involve breaking the bonds of the backbone of the oil-degradable elastomer (e.g., polymer backbone) or causing the bonds of the oil-degradable elastomer to crosslink, such that the oil-degradable elastomer becomes brittle and breaks into small pieces upon contact with even small forces expected in the wellbore environment. Thermal degradation of the oil-degradable elastomer forming at least a portion of the oil-degradable sealing element 285 involves a chemical decomposition due to heat, such as the heat present in a wellbore environment. Thermal degradation of some oil-degradable elastomers described herein may occur at wellbore environment temperatures of greater than about 93° C. (or about 200° F.).

The degradation rate of the oil-degradable elastomer forming the sealing element 285 may be accelerated, rapid, or normal, as defined herein.

Accelerated degradation may be in the range of from a lower limit of about 30 minutes, 1 hour, 2 hours, 3 hours, 4 hours, 5 hours, and 6 hours to an upper limit of about 12 hours, 11 hours, 10 hours, 9 hours, 8 hours, 7 hours, and 6 hours, encompassing any value or subset therebetween. Rapid degradation may be in the range of from a lower limit of about 12 hours, 1 day, 2 days, 3 days, 4 days, and 5 days to an upper limit of about 10 days, 9 days, 8 days, 7 days, 6 days, and 5 days, encompassing any value or subset therebetween. Normal degradation may be in the range of from a lower limit of about 12 days, 13 days, 14 days, 15 days, 16 days, 17 days, 18 days, 19 days, 20 days, 21 days, 22 days, 23 days, 24 days, 25 days, and 26 days to an upper limit of about 40 days, 39 days, 38 days, 37 days, 36 days, 35 days, 34 days, 33 days, 32 days, 31 days, 30 days, 29 days, 28 days, 27 days, and 26 days, encompassing any value or subset therebetween. Accordingly, the degradation may be between about 30 minutes to about 40 days, depending on a number of factors including, but not limited to, the type of oil-degradable elastomer selected, the conditions of the wellbore environment, and the like.

The oil-degradable elastomer forming at least a portion of the oil-degradable sealing element 285 may be formed from, but not limited to, an oil-degradable natural rubber (i.e., cis-1,4-polyisoprene), an oil-degradable synthetic rubber, and any combination thereof. Suitable oil-degradable synthetic rubbers may include, but are not limited to, ethylene propylene diene M-class rubber, isoprene rubber, isobutylene rubber, polyisobutene rubber, styrene-butadiene rubber, silicone rubber, ethylene propylene rubber, butyl rubber, norbornene rubber, polynorbornene rubber, a block polymer of styrene, a block polymer of styrene and butadiene, a block polymer of styrene and isoprene, a polyepichlorohydrin, a copolymer of ethylene oxide/polyepichlorohydrin, a terpolymers of epichlorohydrin/ethylene oxide/allyl glycidyl ether, and any combination thereof.

In some embodiments, the oil-degradable elastomer forming the sealing element 285 may have a thermoplastic polymer embedded therein. The thermoplastic polymer may modify the strength, resiliency, or modulus of the sealing element 285 and may also control the degradation rate of the sealing element 285. Suitable thermoplastic polymers may include, but are not limited to, an acrylate (e.g., polymethylmethacrylate, polyoxymethylene, a polyamide, a polyolefin, an aliphatic polyamide, polybutylene terephthalate, polyethylene terephthalate, polycarbonate, polyester, polyethylene, polyetheretherketone, polypropylene, polystyrene, polyvinylidene chloride, styrene-acrylonitrile), polyurethane prepolymer, polystyrene, poly(o-methylstyrene), poly(α-methylstyrene), poly(p-methylstyrene), poly(2,4-dimethylstyrene), poly(2,5-dimethylstyrene), poly(p-tert-butylstyrene), poly(p-chlorostyrene), poly(α-methylstyrene), co- and ter-polymers of polystyrene, acrylic resin, cellulosic resin, polyvinyl toluene, and any combination thereof. Each of the foregoing may further comprise acrylonitrile, vinyl toluene, or methyl methacrylate. The amount of thermoplastic polymer that may be embedded in the oil-degradable elastomer forming the sealing element 285 may be any amount that confers a desirable elasticity without affecting the desired amount of degradation. In some embodiments, the thermoplastic polymer may be included in an amount in the range of a lower limit of about 1%, 5%, 10%, 15%, 20%, 25%, 30%, 35%, 40%, and 45% to an upper limit of about 91%, 85%, 80%, 75%, 70%, 65%, 60%, 55%, 50%, and 45% by weight of the oil-degradable elastomer, encompassing any value or subset therebetween.

In some embodiments, the oil-degradable sealing element 285 may be at least partially encapsulated in a second material (e.g., a "sheath") formed from an encapsulating material capable of protecting or prolonging degradation of the sealing element 285 in a wellbore environment comprising a hydrocarbon fluid. The sheath may also serve to protect the sealing element 285 from abrasion within the wellbore 120. The structure of the sheath may be permeable, frangible, or of a material that is at least partially removable a desired rate within the wellbore environment. Whatever the structure, the sheath is designed such that it does not interfere with the ability of the sealing element 285 to form a fluid seal in the wellbore 120. The encapsulating material forming the sheath may be any material capable of use in a downhole environment and, depending on the structure of the sheath may, or may not, be elastic such that it expands with the sealing element 285. For example, a frangible sheath may break as the sealing element 285 expands to form a fluid seal, whereas a permeable sheath may remain in place on the sealing element 285 as it forms the fluid seal. As used herein, the term "permeable" refers to a structure that permits fluids (including liquids and gases) therethrough and is not limited to any particular configuration.

The encapsulating material forming the sheath may be of any material that the sealing element 285 itself may be made of, as described above, including oil-degradable materials having thermoplastic polymers embedded therein. For example, the sheath may be made of an oil-degradable material that degrades faster than the oil-degradable material forming the sealing element 285. Other suitable encapsulating materials may include, but are not limited to, a wax, a drying oil, a polyurethane, a crosslinked partially hydrolyzed polyacrylic, a silicate material, a glass material, an inorganic durable material, a polymer, a polylactic acid, a polyvinyl alcohol, a polyvinylidene chloride, and any combination thereof.

The body 210, or a portion thereof, may also be composed of a degradable material. Unlike the sealing element 285, the body 210 is sufficiently rigid to provide structural integrity to the downhole tool, or frac plug 200. The body 210 may degrade in the wellbore environment such as when exposed to an aqueous fluid, an elevated wellbore temperature, and/or a hydrocarbon fluid. The aqueous fluid may be any aqueous fluid present in the wellbore environment including, but not limited to, fresh water, saltwater (e.g., water containing one or more salts dissolved therein), brine (e.g., saturated salt water), seawater, or combinations thereof. Accordingly, the aqueous fluid may comprise ionic salts. The aqueous fluid may come from the wellbore 120 itself (i.e., the subterranean formation) or may be introduced by a wellbore operator. The body 210 may thermally degrade in a wellbore environment having temperatures greater than about 93° C. (or about 200° F.). The body 210 may also degrade upon contact with a hydrocarbon fluid in the wellbore environment, like the sealing element 285. In such cases, the hydrocarbon fluid may be any of the hydrocarbon fluids previously mentioned with respect to degradation of the sealing element 285. Suitable materials for forming the body 210 may include, but are not limited to, a polysaccharide, chitin, chitosan, a protein, an aliphatic polyester, poly(c-caprolactone), a poly(hydroxybutyrate), poly(ethyleneoxide), poly(phenyllactide), a poly(amino acid), a poly(orthoester), polyphosphazene, a polylactide, a polyglycolide, a poly(anhydride) (e.g., poly(adipic anhydride), poly(suberic anhydride), poly(sebacic anhydride), poly(dodecanedioic anhydride), poly(maleic anhydride), and poly(benzoic anhydride), and the like), a polyepichlorohydrin, a copolymer of ethylene oxide/polyepichlorohydrin, a terpolymers of epichlorohydrin/ethylene oxide/allyl glycidyl ether, and any combination thereof.

In some embodiments, the body 210 may release an accelerant during degradation that accelerates the degradation of the sealing element 285. In other embodiments, the sealing element 285 may release an accelerant that accelerates the degradation of the body 210. In some cases, the accelerant is a natural component that is released upon degradation of either the body 210 or the sealing element 285, such as an acid (e.g., release of an acid upon degradation of the body 210 formed from a polylactide). Similarly, the body 210 may release a base that would aid in degrading the sealing element 285, such as, for example, if the body 210 were composed of a galvanically reacting material. In other cases, the accelerant may be embedded in the material forming either or both of the body 210 and the sealing element 285. The accelerant may be in any form, including a solid or a liquid.

Suitable accelerants may include, but are not limited to, a chemical, a crosslinker, sulfur, a sulfur releasing agent, a peroxide, a peroxide releasing agent, a catalyst, an acid releasing agent, a base releasing agent, and any combination thereof. In some embodiments, the accelerant may cause the body 210 or the sealing element 285 to become brittle to aid in degradation. Specific accelerants may include, but are not limited to, a polylactide, a polyglycolide, an ester, a cyclic ester, a diester, an anhydride, a lactone, an amide, an anhydride, an alkali metal alkoxide, a carbonate, a bicarbonate, an alcohol, an alkali metal hydroxide, ammonium hydroxide, sodium hydroxide, potassium hydroxide, an amine, an alkanol amine, an inorganic acid or precursor thereof (e.g., hydrochloric acid, hydrofluoric acid, ammonium bifluoride, and the like), an organic acid or precursor thereof (e.g., formic acid, acetic acid, lactic acid, glycolic acid, aminopolycarboxylic acid, polyaminopolycarboxylic acid, and the like), and any combination thereof.

The accelerant, when embedded in the body 210 or the sealing element 285, may be present in the range of from a lower limit of about 0.01%, 0.01%, 0.1%, 1%, 2%, 3%, 4%, 5%, 6%, 7%, 8%, 9%, 10%, and 11% to an upper limit of about 25%, 24%, 23%, 22%, 21%, 20%, 19%, 18%, 17%, 16%, 15%, 14%, 13%, 12%, and 11% by weight of the material forming the body 210 or the sealing element 285.

Each of the individual components forming the body 210 and the sealing element 285 (i.e., the primary material and any additional material embedded therein) is preferably present in the body 210 and the sealing element 285 uniformly (i.e., distributed uniformly throughout). The choices and relative amounts of each component are adjusted for the particular downhole operation (e.g., fracturing, workover, and the like) and the desired degradation rate (i.e., accelerated, rapid, or normal) of the body 210 and/or sealing element 285. Factors that may affect the selection and amount of components may include, for example, the temperature of the subterranean formation in which the downhole operation is being performed, the expected amount of aqueous and/or hydrocarbon fluid in the wellbore environment, the amount of elasticity required for the sealing element 285 (e.g., based on wellbore diameter, for example), and the like.

Figure 3:
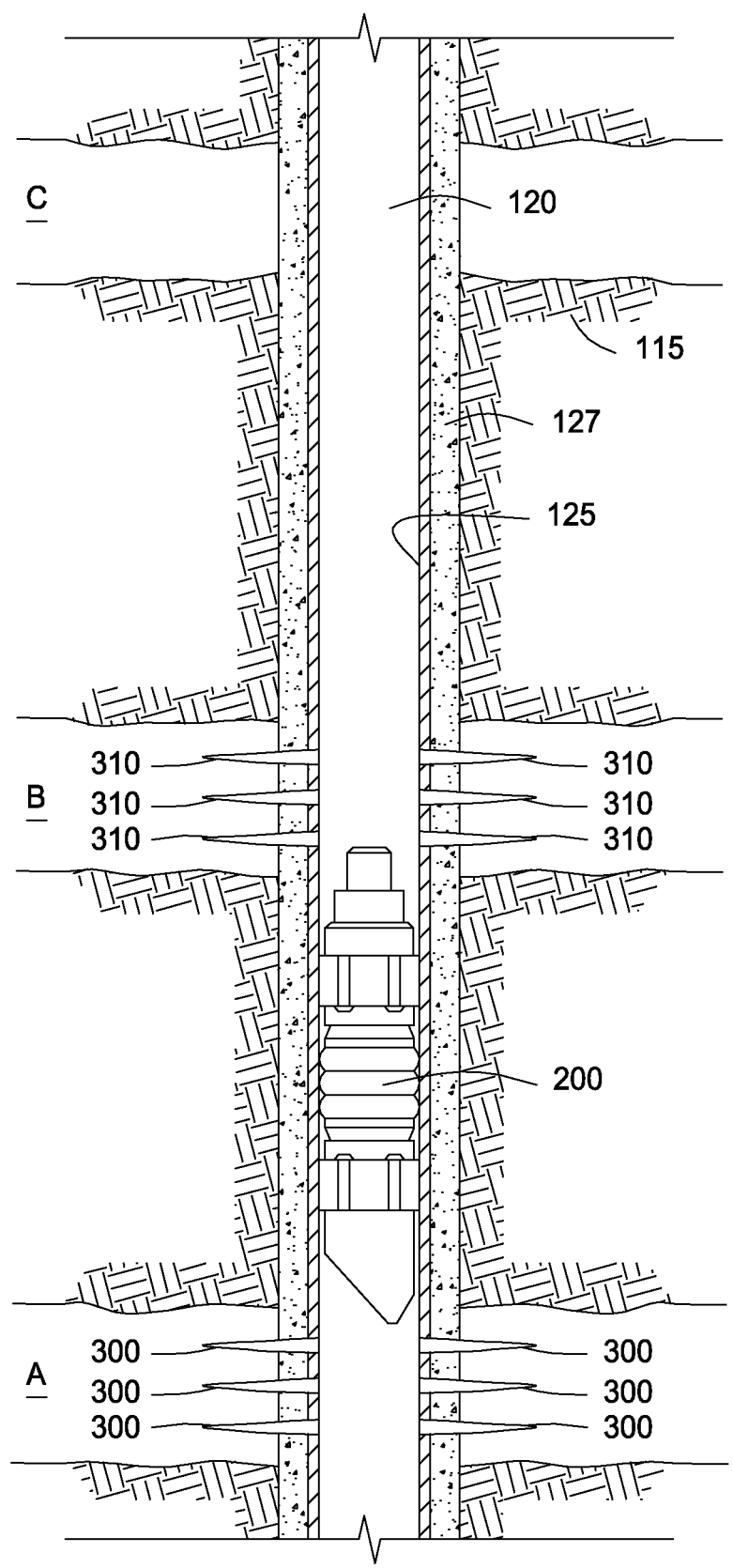
FIG. 3 shows an enlarged cross-sectional view of a downhole tool in operation, according to one or more embodiments described herein.

Referring again to FIG. 2, in operation the frac plug 200 may be used in a downhole fracturing operation to isolate a zone of the formation 115 below the frac plug 200. Referring now to FIG. 3, with continued reference to FIG. 2, the frac plug 200 is shown disposed between producing zone A and producing zone B in formation 115. In a conventional fracturing operation, before setting the frac plug 200 to isolate zone A from zone B, a plurality of perforations 300 are made by a perforating tool (not shown) through the casing 125 and cement 127 to extend into producing zone A. Then a well stimulation fluid is introduced into the wellbore 120, such as by lowering a tool (not shown) into the wellbore 120 for discharging the fluid at a relatively high pressure or by pumping the fluid directly from the derrick 112 (FIG. 1) into the wellbore 120. The well stimulation fluid passes through the perforations 300 into producing zone A of the formation 115 for stimulating the recovery of fluids in the form of oil and gas containing hydrocarbons. These production fluids pass from zone A, through the perforations 300, and up the wellbore 120 for recovery at the surface 105 (FIG. 1).

The frac plug 200 is then lowered by the tool string 118 (FIG. 1) to the desired depth within the wellbore 120, and the sealing element 285 (FIG. 2) is set against the casing 125, thereby isolating zone A as depicted in FIG. 3. Due to the design of the frac plug 200, the flowbore 205 (FIG. 2) of the frac plug 200 allows fluid from isolated zone A to flow upwardly through the frac plug 200 while preventing flow downwardly into the isolated zone A. Accordingly, the production fluids from zone A continue to pass through the perforations 300, into the wellbore 120, and upwardly through the flowbore 205 of the frac plug 200, before flowing into the wellbore 120 above the frac plug 200 for recovery at the surface 105.

After the frac plug 200 is set into position, as shown in FIG. 3, a second set of perforations 310 may then be formed through the casing 125 and cement 127 adjacent intermediate producing zone B of the formation 115. Zone B is then treated with well stimulation fluid, causing the recovered fluids from zone B to pass through the perforations 310 into the wellbore 120. In this area of the wellbore 120 above the frac plug 200, the recovered fluids from zone B will mix with the recovered fluids from zone A before flowing upwardly within the wellbore 120 for recovery at the surface 105.

If additional fracturing operations will be performed, such as recovering hydrocarbons from zone C, additional frac plugs 200 may be installed within the wellbore 120 to isolate each zone of the formation 115. Each frac plug 200 allows fluid to flow upwardly therethrough from the lowermost zone A to the uppermost zone C of the formation 115, but pressurized fluid cannot flow downwardly through the frac plug 200.

After the fluid recovery operations are complete, the frac plug 200 must be removed from the wellbore 120. In this context, as stated above, at least a portion of the sealing element 285 and/or body 210 (FIG. 2) of the frac plug 200 may degrade by exposure to the wellbore environment. For example, the sealing element 285 may degrade slowly as the produced hydrocarbon fluids flow past the frac plug 200 to the surface 105. The body 210 may degrade upon prolonged contact with aqueous fluids present naturally in the wellbore 120. Other combinations of degradability are suitable, without departing from the scope of the present disclosure, as discussed above, for example.

Accordingly, in an embodiment, the frac plug 200 is designed to decompose over time while operating in a wellbore environment, thereby eliminating the need to mill or drill the frac plug 200 out of the wellbore 120. Thus, by exposing the biodegradable frac plug 200 to wellbore temperatures and an aqueous fluid, at least some of its components will decompose, causing the frac plug 200 to lose structural and/or functional integrity and release from the casing 125. The remaining components of the frac plug 200 will simply fall to the bottom of the wellbore 120. In various alternate embodiments, degrading one or more components of a downhole tool 100 performs an actuation function, opens a passage, releases a retained member, or otherwise changes the operating mode of the downhole tool 100. Also, as described above, the material or components embedded therein for forming the body 210 and sealing element 285 of the frac plug 200, as well as the use of the optional sheath, may be selected to control the decomposition rate of the frac plug 200.

Referring again to FIG. 1, removing the downhole tool 100, described herein from the wellbore 120 is more cost effective and less time consuming than removing conventional downhole tools, which require making one or more trips into the wellbore 120 with a mill or drill to gradually grind or cut the tool away. Instead, the downhole tools 100 described herein are removable by simply exposing the tools 100 to a naturally occurring downhole environment over time. The foregoing descriptions of specific embodiments of the downhole took 100, and the systems and methods for removing the biodegradable tool 100 from the wellbore 120 have been presented for purposes of illustration and description and are not intended to be exhaustive or to limit this disclosure to the precise forms disclosed. Many other modifications and variations are possible. In particular, the type of downhole tool 100, or the particular components that make up the downhole tool 100 (e.g., the body and sealing element) may be varied. For example, instead of a frac plug 200 (FIG. 2), the downhole tool 100 may comprise a bridge plug, which is designed to seal the wellbore 120 and isolate the zones above and below the bridge plug, allowing no fluid communication in either direction. Alternatively, the biodegradable downhole tool 100 could comprise a packer that includes a shiftable valve such that the packer may perform like a bridge plug to isolate two formation zones, or the shiftable valve may be opened to enable fluid communication therethrough. Similarly, the downhole tool 100 could comprise a wiper plug or a cement plug.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include Embodiment A, Embodiment B, and Embodiment C.

Embodiment A: A downhole tool comprising: a body, wherein at least a portion of the body is degradable when exposed to a wellbore environment; and at least one oil-degradable sealing element composed of an oil-degradable elastomer, wherein the oil-degradable sealing element degrades in the wellbore environment.

Embodiment A may have one or more of the following additional elements in any combination:

Element A1: Wherein the oil-degradable elastomer is selected from the group consisting of an oil-degradable natural rubber, an oil-degradable synthetic rubber, and any combination thereof.

Element A2: Wherein the oil-degradable elastomer is an oil-degradable synthetic rubber selected from the group consisting of ethylene propylene diene M-class rubber, isoprene rubber, isobutylene rubber, polyisobutene rubber, styrene-butadiene rubber, silicone rubber, ethylene propylene rubber, butyl rubber, norbornene rubber, polynorbornene rubber, a block polymer of styrene, a block polymer of styrene and butadiene, a block polymer of styrene and isoprene, a polyepichlorohydrin, a copolymer of ethylene oxide/polyepichlorohydrin, a terpolymers of epichlorohydrin/ethylene oxide/allyl glycidyl either, and any combination thereof.

Element A3: Wherein the body is degradable when exposed to at least one of an aqueous fluid, a wellbore temperature of at least about 93° C., and a hydrocarbon fluid in the wellbore environment.

Element A4: Wherein the body is degradable when exposed to at least one of an aqueous fluid, a wellbore temperature of at least about 93° C., and a hydrocarbon fluid in the wellbore environment, and wherein the aqueous fluid in the wellbore environment further comprises an ionic salt.

Element A5: Wherein the downhole tool is a wellbore zonal isolation device.

Element A6: Wherein the downhole tool is a wellbore zonal isolation device, and wherein the wellbore zonal isolation device is selected from the group consisting of a frac plug, a bridge plug, or a packer.

Element A7: Wherein the oil-degradable sealing element is at least partially encapsulated in a second material, and wherein the second material delays degradation of the oil-degradable sealing element.

Element A8: Wherein the oil-degradable sealing element releases an accelerant during degradation, and wherein the accelerant accelerates the degradation of the portion of the body that is degradable.

Element A9: Wherein the oil-degradable elastomer further comprises a thermoplastic polymer embedded therein.

Element A10: Wherein the portion of the body that is degradable releases an accelerant during degradation, and wherein the accelerant accelerates the degradation of the oil-degradable sealing element.

By way of non-limiting example, exemplary combinations applicable to Embodiment A include: combinations of A1 and A2; A1 and A10; A3, A4, and A9; A6 and A7; A2, A3, and A8; A4 and A6; A5 and A7; and the like.

Embodiment B: A method comprising: installing a downhole tool in a wellbore, wherein the downhole tool comprises a body and at least one oil-degradable sealing element composed of an oil-degradable elastomer, and wherein at least a portion of the body is degradable when exposed to the wellbore environment and the oil-degradable sealing element degrades in the wellbore environment; fluidly sealing two sections of the wellbore with the oil-degradable sealing element of the downhole tool, the oil-degradable sealing element capable of holding a differential pressure; performing a downhole operation; and degrading at least a portion of the oil-degradable sealing element such that the oil-degradable sealing element no longer is capable of holding the differential pressure.

Embodiment B may have one or more of the following additional elements in any combination:

Element B1: Further comprising degrading at least a portion of the portion of the body that is degradable.

Element B2: Wherein the body is degradable when exposed to at least one of an aqueous fluid, a wellbore temperature of at least about 93° C., and a hydrocarbon fluid in the wellbore environment.

Element B3: Wherein the body is degradable when exposed to at least one of an aqueous fluid, a wellbore temperature of at least about 93° C., and a hydrocarbon fluid in the wellbore environment, and wherein the aqueous fluid further comprises an ionic salt.

Element B4: Wherein the oil-degradable elastomer is selected from the group consisting of an oil-degradable natural rubber, an oil-degradable synthetic rubber, and any combination thereof.

Element B5: wherein the oil-degradable sealing element is at least partially encapsulated in a second material, and wherein the second material delays degradation of the oil-degradable sealing element.

Element B6: Wherein the portion of the body that is degradable releases an accelerant during degradation, and wherein the accelerant accelerates the degradation of the oil-degradable sealing element.

Element B7: Wherein the oil-degradable sealing element releases an accelerant during degradation, and wherein the accelerant accelerates the degradation of the portion of the body that is degradable.

Element B8: Wherein the oil-degradable elastomer further comprises a thermoplastic polymer embedded therein.

Element B9: Wherein the downhole operation is a fluid injection operation.

Element B10: Wherein the downhole operation is a fluid injection operation that is a hydraulic fracturing operation.

Element B11: Wherein the oil-degradable elastomer is an oil-degradable synthetic rubber selected from the group consisting of ethylene propylene diene M-class rubber, isoprene rubber, isobutylene rubber, polyisobutene rubber, styrene-butadiene rubber, silicone rubber, ethylene propylene rubber, butyl rubber, norbornene rubber, polynorbornene rubber, a block polymer of styrene, a block polymer of styrene and butadiene, a block polymer of styrene and isoprene, a polyepichlorohydrin, a copolymer of ethylene oxide/polyepichlorohydrin, a terpolymers of epichlorohydrin/ethylene oxide/allyl glycidyl either, and any combination thereof.

Element B12: Wherein the downhole tool is a wellbore zonal isolation device.

Element B13: Wherein the downhole tool is a wellbore zonal isolation device, and wherein the wellbore zonal isolation device is selected from the group consisting of a frac plug, a bridge plug, or a packer.

By way of non-limiting example, exemplary combinations applicable to Embodiment B include: B1 and B3; B2, B9, and B10; B6 and B7; B1 and B2; B4, B6, and B8; B9 and B10; B10 and B11; B2 and B12; B4, B5, and B13; B2 and B13.

Embodiment C: A system comprising: a wellbore; and a downhole tool capable of being disposed in the wellbore to fluidly seal two sections thereof, the downhole tool comprising a body and at least one oil-degradable sealing element composed of an oil-degradable elastomer and the oil-degradable sealing element is capable of holding a differential pressure, wherein at least a portion of the body is degradable when exposed to the wellbore environment and the oil-degradable sealing element degrades in the wellbore environment.

Embodiment C may have one or more of the following additional elements in any combination:

Element C1: Wherein the oil-degradable elastomer is selected from the group consisting of an oil-degradable natural rubber, an oil-degradable synthetic rubber, and any combination thereof.

Element C2: Wherein the oil-degradable sealing element is at least partially encapsulated in a second material, and wherein the second material delays degradation of the oil-degradable sealing element.

Element C3: Wherein the portion of the body that is degradable releases an accelerant during degradation, and wherein the accelerant accelerates the degradation of the oil-degradable sealing element.

Element C4: Wherein the oil-degradable sealing element releases an accelerant during degradation, and wherein the accelerant accelerates the degradation of the portion of the body that is degradable.

Element C5: Wherein the oil-degradable elastomer further comprises a thermoplastic polymer embedded therein.

Element C6: Wherein the body is degradable when exposed to at least one of an aqueous fluid, a wellbore temperature of at least about 93° C., and a hydrocarbon fluid in the wellbore environment.

Element C7: Wherein the body is degradable when exposed to at least one of an aqueous fluid, a wellbore temperature of at least about 93° C., and a hydrocarbon fluid in the wellbore environment, and wherein the aqueous fluid further comprises an ionic salt.

Element C8: Wherein the oil-degradable elastomer is an oil-degradable synthetic rubber selected from the group consisting of ethylene propylene diene M-class rubber, isoprene rubber, isobutylene rubber, polyisobutene rubber, styrene-butadiene rubber, silicone rubber, ethylene propylene rubber, butyl rubber, norbornene rubber, polynorbornene rubber, a block polymer of styrene, a block polymer of styrene and butadiene, a block polymer of styrene and isoprene, a polyepichlorohydrin, a copolymer of ethylene oxide/polyepichlorohydrin, a terpolymers of epichlorohydrin/ethylene oxide/allyl glycidyl either, and any combination thereof.

Element C9: Wherein the downhole tool is a wellbore zonal isolation device.

Element C10: Wherein the downhole tool is a wellbore zonal isolation device, and wherein the wellbore zonal isolation device is selected from the group consisting of a frac plug, a bridge plug, or a packer.

By way of non-limiting example, exemplary combinations applicable to Embodiment C include: C1 and C6; C1 and C2; C4, C7, and C8; C3 and C10; C9 and C10; C2, C4, C7, and C8.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A downhole tool comprising:
an aqueous-degradable body, wherein at least a portion of the body is degradable when exposed to a wellbore environment; wherein the aqueous-degradable body releases a base during degradation, the base for aiding in degradation of an oil-degradable sealing element, and
the oil-degradable sealing element composed of an oil-degradable elastomer, wherein the oil-degradable sealing element degrades in the wellbore environment, and the oil-degradable sealing element is capable of holding a differential pressure,
wherein the oil-degradable elastomer is an oil-degradable synthetic rubber selected from the group consisting of isobutylene rubber, polyisobutene rubber, silicone rubber, a block polymer of styrene, a block polymer of styrene and butadiene, a block polymer of styrene and isoprene, a polyepichlorohydrin, a copolymer of ethylene oxide/polyepichlorohydrin, a terpolymers of epichlorohydrin/ethylene oxide/allyl glycidyl ether, and any combination thereof,
wherein the oil-degradable sealing element is at least partially encapsulated in a second material forming a permeable sheath for delaying degradation of the oil-degradable sealing element, the oil-degradable sealing element having at least one section able to form a fluid seal between two sections of the wellbore during a wellbore operation and the second material having at least one other section that doesn't interfere with the ability of the oil-degradable sealing element to form the fluid seal.

2. The downhole tool of claim 1, wherein the body is degradable when exposed to at least one of an aqueous fluid, a wellbore temperature of at least about 93° C., and a hydrocarbon fluid in the wellbore environment.

3. The downhole tool of claim 2, wherein the aqueous fluid in the wellbore environment further comprises an ionic salt.

4. The downhole tool of claim 1, wherein the downhole tool is a wellbore zonal isolation device.

5. The downhole tool of claim 4, wherein the wellbore zonal isolation device is selected from the group consisting of a frac plug, a bridge plug, or a packer.

6. The downhole tool of claim 1, wherein the portion of the body that is degradable releases another accelerant during degradation, and wherein the another accelerant accelerates the degradation of the oil-degradable sealing element.

7. The downhole tool of claim 1, wherein the accelerant accelerates the degradation of the portion of the body that is degradable.

8. The downhole tool of claim 1, wherein the oil-degradable elastomer further comprises a thermoplastic polymer embedded therein.

9. The downhole tool of claim 1, wherein the accelerant further includes another base, sulfur, a sulfur releasing agent, a peroxide, or a peroxide releasing agent.

10. The downhole tool of claim 1, wherein the second material is a polyurethane.

11. The downhole tool of claim 1, wherein the at least a portion of the body comprises an aqueous-degradable body.

12. A method comprising:
    installing a downhole tool in a wellbore, wherein the downhole tool comprises a body and at least one oil-degradable sealing element composed of an oil-degradable elastomer rubber; wherein in the installing step, the body comprises an aqueous-degradable body; wherein the aqueous-degradable body releases a base during degradation, the base for aiding in degradation of the oil-degradable sealing element, and
    wherein at least a portion of the body is degradable when exposed to the wellbore environment and the oil-degradable sealing element degrades in the wellbore environment;
    fluidly sealing two sections of the wellbore with the oil-degradable sealing element of the downhole tool, the oil-degradable sealing element capable of holding a differential pressure;
    performing a downhole operation; and
    degrading at least a portion of the oil-degradable sealing element such that the oil-degradable sealing element no longer is capable of holding the differential pressure,
    wherein the oil-degradable elastomer is an oil-degradable synthetic rubber selected from the group consisting of isobutylene rubber, polyisobutene rubber, silicone rubber, a block polymer of styrene, a block polymer of styrene and butadiene, a block polymer of styrene and isoprene, a polyepichlorohydrin, a copolymer of ethylene oxide/polyepichlorohydrin, a terpolymers of epichlorohydrin/ethylene oxide/allyl glycidyl ether, and any combination thereof,
    wherein the oil-degradable sealing element is at least partially encapsulated in a second material forming a sheath, the sheath being permeable permitting fluids therethrough and for delaying degradation of the oil-degradable sealing element.

13. The method of claim 12, further comprising degrading at least a portion of the portion of the body that is degradable.

14. The method of claim 12, wherein the body is degradable when exposed to at least one of an aqueous fluid, a wellbore temperature of at least about 93° C., and a hydrocarbon fluid in the wellbore environment.

15. The method of claim 14, wherein the aqueous fluid further comprises an ionic salt.

16. The method of claim 12, wherein the portion of the body that is degradable releases another accelerant during degradation, and wherein the another accelerant accelerates the degradation of the oil-degradable sealing element.

17. The method of claim 12, wherein the accelerant accelerates the degradation of the portion of the body that is degradable.

18. The method of claim 12, wherein the oil-degradable elastomer further comprises a thermoplastic polymer embedded therein.

19. The method of claim 12, wherein the downhole operation is a fluid injection operation.

20. The method of claim 19, wherein the fluid injection operation is a hydraulic fracturing operation.

21. The method of claim 12, wherein the accelerant further includes a base, sulfur, a sulfur releasing agent, a peroxide, or a peroxide releasing agent.

22. The method of claim 12, further comprising a frangible sheath encapsulating the at least one oil-degradable sealing element, the frangible sheath comprising a polyurethane.

23. The method of claim 12, wherein in the degrading step, the oil-degradable sealing element releases an accelerant.

24. A system comprising:
    a wellbore; and
    a downhole tool capable of being disposed in the wellbore to fluidly seal two sections thereof, the downhole tool comprising a body and at least one oil-degradable sealing element composed of an oil-degradable elastomer and the oil-degradable sealing element is capable of holding a differential pressure; wherein the body comprises an aqueous-degradable body; wherein the aqueous-degradable body releases a base during degradation, the base for aiding in degradation of the oil-degradable sealing element,
    wherein at least a portion of the body is degradable when exposed to the wellbore environment and the oil-degradable sealing element degrades in the wellbore environment,
    wherein the oil-degradable elastomer is an oil-degradable synthetic rubber selected from the group consisting of isobutylene rubber, polyisobutene rubber, silicone rubber, a block polymer of styrene, a block polymer of styrene and butadiene, a block polymer of styrene and isoprene, a polyepichlorohydrin, a copolymer of ethylene oxide/polyepichlorohydrin, a terpolymers of epichlorohydrin/ethylene oxide/allyl glycidyl ether, and any combination thereof, and,
    wherein the oil-degradable sealing element is at least partially encapsulated in a second material forming a permeable sheath for delaying degradation of the oil-degradable sealing element, the oil-degradable sealing element having at least one section able to form a fluid seal between two sections of the wellbore during a wellbore operation.

25. The system of claim 24, wherein the portion of the body that is degradable releases another accelerant during degradation, and wherein the another accelerant accelerates the degradation of the oil-degradable sealing element.

26. The system of claim 24, wherein the accelerant accelerates the degradation of the portion of the body that is degradable.

27. The system of claim 24, wherein the oil-degradable elastomer further comprises a thermoplastic polymer embedded therein.

28. The system of claim 24, wherein the accelerant further includes a base, sulfur, a sulfur releasing agent, or a base releasing agent.

29. The system of claim 24, further comprising a frangible sheath encapsulating the at least one oil-degradable sealing element, the frangible sheath comprising a polyurethane.

30. The system of claim 24, wherein the body comprises a galvanically reacting material.

31. The system of claim 24, wherein the oil-degradable sealing element releases an accelerant during degradation, the cross-linker being a cross-linker.

* * * * *